United States Patent
Moser et al.

(10) Patent No.: US 9,157,593 B2
(45) Date of Patent: Oct. 13, 2015

(54) VEHICLE HEADLIGHT HAVING LED LIGHT MODULES FOR GENERATING A MAIN LIGHT DISTRIBUTION AND AN ADDITIONAL LIGHT DISTRIBUTION

(75) Inventors: Andreas Moser, Haag (AT); Johannes Jungwirth, Ferschnitz (AT)

(73) Assignee: ZIZALA LICHTSYSTEME GMBH, Wieselburg (AT)

( * ) Notice: Subject to any disclaimer, the term of this patent is extended or adjusted under 35 U.S.C. 154(b) by 212 days.

(21) Appl. No.: 14/112,439

(22) PCT Filed: Apr. 5, 2012

(86) PCT No.: PCT/AT2012/050047
§ 371 (c)(1),
(2), (4) Date: Oct. 17, 2013

(87) PCT Pub. No.: WO2012/162713
PCT Pub. Date: Dec. 6, 2012

(65) Prior Publication Data
US 2014/0043843 A1    Feb. 13, 2014

(30) Foreign Application Priority Data
May 30, 2011    (AT) .................. A 792/2011

(51) Int. Cl.
*B60Q 1/04*      (2006.01)
*F21S 8/10*      (2006.01)

(52) U.S. Cl.
CPC ........... *F21S 48/115* (2013.01); *F21S 48/1154* (2013.01); *F21S 48/1163* (2013.01); *F21S 48/1747* (2013.01); *B60Q 2400/30* (2013.01)

(58) Field of Classification Search
CPC . F21S 48/1747; F21S 48/115; F21S 48/1154; B60Q 2400/30; B60Q 1/18; B60Q 1/20
USPC ........................................................ 362/545
See application file for complete search history.

(56) References Cited

U.S. PATENT DOCUMENTS

| 7,654,712 | B2 * | 2/2010 | Takeda et al. | 362/459 |
| 2008/0239746 | A1 * | 10/2008 | Wuller et al. | 362/538 |
| 2011/0080753 | A1 * | 4/2011 | Hering et al. | 362/545 |

FOREIGN PATENT DOCUMENTS

WO    WO 2010/034276    *   4/2010    ........... F21S 48/115

* cited by examiner

*Primary Examiner* — Peggy Neils
(74) *Attorney, Agent, or Firm* — Sutherland Asbill & Brennan LLP (57) ABSTRACT

A vehicle headlight for generating a main light distribution and a secondary light distribution is disclosed. The vehicle headlight comprises two or more LED light modules. Each LED light module comprises a number of LED light sources. Each LED light module comprises a lens. The light emitted by the LED light sources of an LED module is irradiated directly onto the lens and is projected therefrom into the outside space. The light emitted by the LED light sources of the LED modules forms the main light distribution or the secondary light distribution.

35 Claims, 4 Drawing Sheets

VEHICLE HEADLIGHT HAVING LED LIGHT MODULES FOR GENERATING A MAIN LIGHT DISTRIBUTION AND AN ADDITIONAL LIGHT DISTRIBUTION

The invention relates to a vehicle headlight for generating a main light distribution and a secondary light distribution, wherein the vehicle headlight comprises two or more LED light modules.

It is known to construct a vehicle headlight from a number of light modules, in particular LED light modules, which, during operation, that is to say when the light modules are lit, give the headlight a characteristic look corresponding to the arrangement of the light modules.

This characteristic appearance generates a high recognition factor for the different makes of car.

Besides the main-lighting function, for example a dipped lighting function, a secondary lighting function, for example a daytime running light, can now be generated with such a headlight. To this end, it is generally necessary for other light modules to be switched on or for fewer light modules to be switched on compared to the main-lighting function, such that, with activated secondary lighting function, the characteristic appearance of the headlight is no longer provided.

The object of the invention is to create a vehicle headlight which, both with activated main-lighting function and with activated secondary lighting function, has the same visual appearance.

This object is achieved with a headlight as mentioned in the introduction in that, in accordance with the invention, each LED light module comprises a number of LED light sources, wherein each LED light source has a rectangular or square light outlet surface, and wherein the light outlet surfaces are arranged in a common surface, and wherein the side edges of the light outlet surfaces are oriented parallel to one another, and wherein the LED light sources are arranged in horizontal rows and vertical columns, wherein the light outlet surfaces of the LED light sources for generating the secondary light distribution are arranged in a plurality of rows bordering on one another directly, wherein one or more light outlet surfaces of a respective LED light source for generating the secondary light distribution is/are arranged in each row, and wherein the light outlet surfaces of the LED light sources for generating the secondary light distribution are distributed between at least one column, preferably between two or more columns, and wherein the light outlet surfaces of LED light sources for generating the main light distribution are arranged in at least one row, wherein at least one light outlet surface, preferably two or more light outlet surfaces, of LED light sources for generating the main light distribution are arranged in at least one of these rows, and wherein each LED light module comprises a lens, and wherein the light emitted by the LED light sources of an LED module is irradiated directly onto the lens and is projected therefrom into the outside space, wherein the light emitted by the LED light sources of the LED modules forms the main light distribution or the secondary light distribution.

Due to the specific arrangement of the light outlet surfaces of the LED light sources, a high maximum in the light flux can be achieved on the one hand (by the arrangement in at least one row of the light outlet surfaces of LED light sources for generating the main light distribution) in a specific region of the main light distribution, for example in the case of a dipped headlight beam distribution in the region of the light/dark line, and on the other hand the required expansion over a defined vertical region conventional for such a light distribution, for example in the case of a daytime running light distribution, is provided via the distribution of the light outlet surfaces for the secondary light distribution.

In addition, it is stipulated for the isolux lines, that is to say lines of the same illumination intensity, to have a characteristic predefined course in the light exposure. This is achieved in that the light outlet surfaces in accordance with the invention are arranged in a grid formed of rows and columns.

Due to this specific arrangement, it is possible to dispense with one or more add-on optics that would be arranged between the light outlet surfaces and the lens.

In the case of the main-lighting function, the involved light sources are arranged in a row (or in more than one row). The lenses distribute/spread the light in terms of width, such that the individual light exposures of the individual light sources in the row are horizontally superimposed, such that no grid is visible. (If the lenses were to image "only" the LED light sources without width spreading, which is not the case however, a grid would be visible.)

The above is also true for the other LED light sources for the secondary light distribution. There is no grid in the horizontal extent, since the light exposure of the LED light sources is spread horizontally. By contrast, in the verticals, a grid would be produced if, in contrast to the invention, the LED light sources were arranged in an aligned manner. Without the arrangement according to the invention, dark horizontal streaks would be produced if there were a gap between the LED chips. The lens only spreads the light in the verticals to a comparatively low extent, since otherwise too much light would be distributed and an orderly maximum would no longer be produced in the light exposure.

It must also be taken into consideration that the main-lighting function (this is preferably to be imaged optimally), such as a dipped headlight beam, is likewise projected by the same lens. Here, it is desirable to generate a light exposure that is only a few degrees tall (narrow).

Generally, the LED light sources have to be arranged such that they come to lie as close as possible to the focal point (focal line) of the lens in order to avoid distortions and inhomogeneities caused by aberrations of the lenses.

The LED light sources, that is to say the light outlet surfaces thereof, are arranged for example in a plane surface (plane), the surface may also be curved however, wherein the curvature approximately follows the field curvature of the lens.

It is advantageous if adjacent rows border on one another directly; it may possibly also be advantageous if adjacent columns likewise border on one another directly, however adjacent columns may also be arranged at a distance from one another, or this may be advantageous.

If the vertical extension ("height") of a light outlet surface of the LED light sources corresponds to the height of the row in which it is arranged, it is then ensured in this case that no horizontal stripes are formed in the light exposure in the directly bordering row.

If the horizontal extent ("width") of a light outlet surface of an LED light source corresponds to the width of the column in which it is arranged, it is also ensured that no vertical strips are produced in the light exposure—this arrangement is not absolutely necessary however, since the creation of vertical stripes in the light exposure is generally prevented however by the wide illumination of the lenses.

The horizontal (or where applicable vertical) delimiting sides of the light outlet surfaces are aligned with one another in rows that border on one another (or where applicable columns), whereby the stripe formation in the secondary light exposure is prevented.

It is further advantageous if the height of all rows is the same and the width of all columns is the same. In this case, identical LED light sources can be used.

For example, the height and width of the rows and columns are the same, such that square light outlet surfaces are produced.

It is in particular advantageous for the generation of a homogeneous light exposure if precisely one light outlet surface of an LED light source for generating the secondary light distribution is arranged in each row.

In order to achieve the necessary width of the light distribution and a light exposure that is homogeneous in terms of width, it is additionally advantageous if the light outlet surfaces of the LED light sources for generating the secondary light distribution are distributed between two or more columns.

Furthermore, the light outlet surfaces of LED light sources for generating the main light distribution are arranged in at least one row, wherein two or more light outlet surfaces of LED light sources for generating the main light distribution are arranged in at least one of these rows, wherein the light outlet surfaces are arranged in different columns, wherein the light outlet surfaces of LED light sources for generating the main light distribution are preferably arranged in precisely one row.

In this way, it is possible to satisfy in an optimal manner the conditions placed on a main light distribution (maximum in the light distribution, light/dark border in the case of dipped headlight beam).

The LED light sources themselves typically consist of a housing, in which the light-emitting chip, that is to say the light outlet surface, is accommodated. The housing naturally has a greater extent than this chip, such that it is not generally possible to arrange light outlet surfaces (chips) directly side by side. In addition, it is necessary to lay conductive tracks to the LED light sources for control and power supply purposes, and in addition appropriate cooling of the light sources must be provided.

All of these considerations are taken into account in principle by the offset arrangement according to the invention of the light outlet surfaces, by means of which the problems with regard to space are solved. In addition, a simpler thermal management is possible, since the produced heat can be removed more easily due to the fact that the light outlet surfaces do not border on one another. Accordingly, there is no need for complex coolers/fans, and in some circumstances even purely passive cooling is sufficient.

In particular, it is advantageous in the above context if at least some of the adjacent columns, in which the light outlet surfaces of the LED light sources for generating the main light distribution are arranged, are each separated from one another by a column.

In particular, it is advantageous if, as in the case of a specific embodiment, the light outlet surfaces of LED light sources for generating the main light distribution are arranged in a plurality of columns that are each separated by an intermediate column.

In order to optimally utilize the installation space in the plane of the light outlet surfaces, at least one LED light source of an LED light module may further be used both to generate the main light distribution and to generate the secondary light distribution.

In particular, precisely one LED light source of an LED light module is provided both to generate the main light distribution and to generate the secondary light distribution.

Furthermore, in a specific embodiment, all LED light sources of an LED light module are identical, in particular identical in terms of their luminous intensity.

In the case of secondary light operation, the switched-on LED light sources are operated in a dimmed manner for this purpose.

The LED light sources for generating the main light distribution may also be more intense however than the LED light sources for generating the secondary light distribution.

In this case, only the LED light sources that contribute to both light distributions are operated in a dimmed manner in secondary light operation.

To summarize, it is thus possible for the "main" LED light sources to be operated at full power and for the "auxiliary" LED light sources to be operated in a pulsed manner or with reduced current intensity. It is also conceivable however to use different power classes of the LED light source, accommodated in a favorable standard housing.

The LEDs of the main-lighting function generate a straight, horizontal light distribution with relatively short vertical extension. The asymmetry, required for example with dipped headlight beam, is produced via an asymmetry module.

An above-described layout of light outlet surfaces generally generates an asymmetrical secondary light distribution however. For this reason, it is expedient if the headlight has at least one LED light module comprising a first arrangement of light outlet surfaces of its LED light sources, and wherein at least one further LED light module comprising a second arrangement of light outlet surfaces of its LED light sources is provided, and wherein the first arrangement of the light outlet surfaces and the second arrangement of the light outlet surfaces are arranged in a manner mirroring one another with respect to a vertical surface which contains the optical axis of the LED module.

Both in the left headlight and in the right headlight, a module with a layout and modules with an axially symmetrical layout are used accordingly.

The light distributions can be generated optimally if the at least one row containing the light outlet surfaces of LED light sources for generating the main light distribution is arranged below the uppermost row, which contains at least one light outlet surface for generating the secondary light distribution, and if, furthermore, the at least one row containing the light outlet surfaces of LED light surfaces for generating the main light distribution is arranged above the lowermost row, which contains at least one light outlet surface for generating the secondary light distribution.

Furthermore, it is expedient in the above sense if an outer column is occupied by at least one light outlet surface of an LED light source for generating the main-lighting function and the other outer column is occupied by at least one light outlet surface of an LED light source for generating a secondary lighting function.

In addition, a plurality of columns comprising light outlet surfaces of LED light sources for generating the secondary light distribution advantageously have at least two such light outlet surfaces, preferably precisely two such light outlet surfaces.

Here, in particular, two light outlet surfaces of LED light sources in the same column for generating the secondary light distribution are each separated by at least one row.

It may be favorable if two light outlet surfaces of LED light sources in the same column for generating the secondary light distribution are each separated by precisely one row.

The lenses of the individual light modules are formed in such a way that the super-imposed light exposures of the individual light modules produce the main-lighting function and/or the secondary lighting function.

Here, the emphasis is generally placed on the fact that the main-lighting function is generated optimally, wherein the basic condition applies that the main-lighting function and secondary lighting function must of course meet the legal requirements.

The lenses are preferably free-form lenses and preferably expand the light exposure of the individual LED light sources downwardly and in terms of width.

With a vehicle headlight of the type described above, different main-lighting and secondary lighting functions can be generated. If the main light distribution, for example in the case of a dipped headlight beam distribution, has to have an asymmetrical component in the light distribution, this can then be implemented in the simplest manner if at least one further light module for generating an asymmetry component in the main light distribution is provided.

Here, the at least one further light module has at least one LED light source and at least one lens, wherein the lens is preferably a converging lens. By contrast with the above-discussed light modules, in the case of this light module the light cannot be distributed in width, since this would destroy the asymmetry (at the LD line).

For example, the main light distribution is a dipped light distribution, for example a dipped headlight beam distribution, fog light or motorway light (for example in accordance with ECE Regulation R 123), and the secondary light distribution is a daytime running light distribution.

Based on free-form lenses, different light distributions can be formed which, in the overlap, meet the legal requirements (SAE, ECE, etc.) on the respective lighting function.

The invention will be explained in greater detail hereinafter on the basis of the drawing, in which

Figure 1:
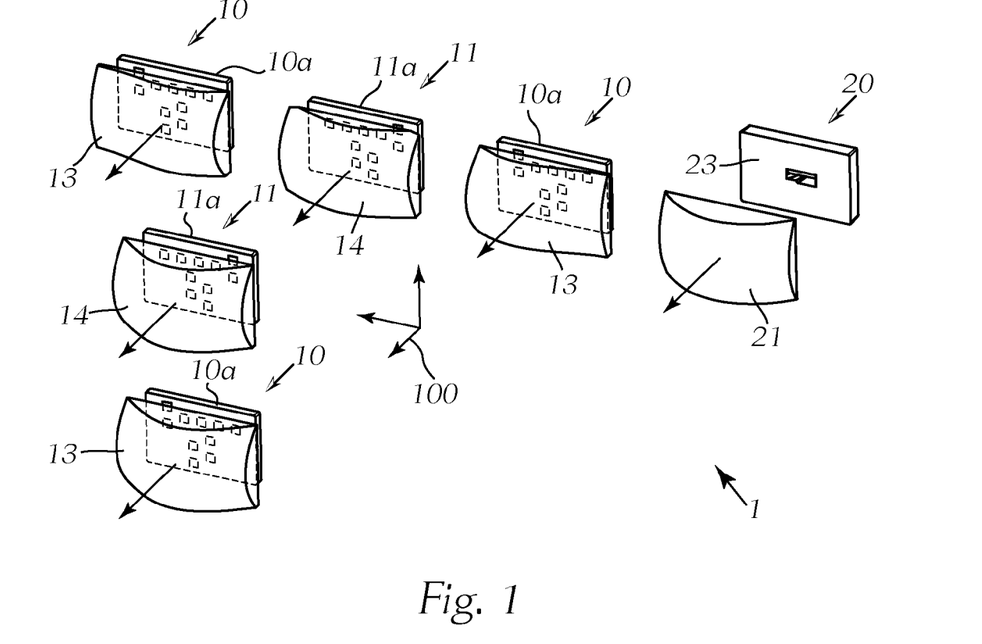
FIG. 1 shows a schematic view diagonally from the front of an exemplary headlight consisting of six light modules.

FIG. 1 shows an exemplary headlight 1, which, for generating a main-lighting light function (main light distribution), is designed in the form of a dipped headlight beam, and, for generating a secondary lighting light function (secondary light distribution), is designed in the form of a daytime running light.

Figure 2:
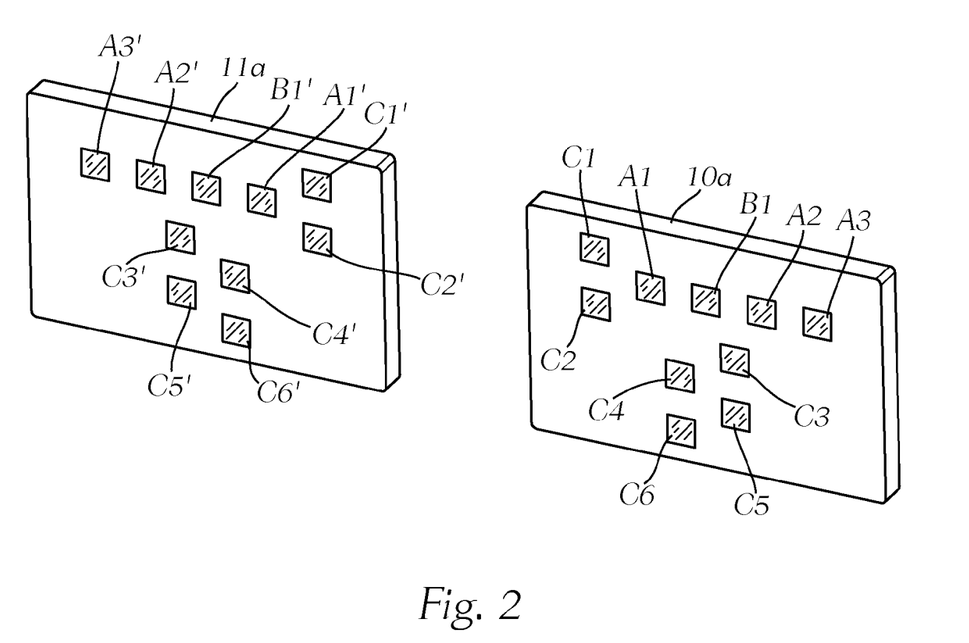
FIG. 2 shows two LED light modules without lenses with mirrored LED arrangement.

The headlight 1 consists of five light modules 10, 11 with LED light sources that are fastened in planes 10a, 11a, and wherein, in terms of the arrangement of the light outlet surfaces of the LED light sources, the light modules 10 have an identical structure (identical layout), and the light modules 11 further likewise have an identical structure. In addition, the layout of the light modules 10 and the layout of the light modules 11 mirror one another, as can be seen in FIG. 2 and as will be described in greater detail further below.

Each light module 10, 11 has a lens, preferably a free-form lens 13, 14, wherein the lenses differ in their detail, as will be discussed later. These free-form lenses 13, 14 expand the light coming from the LED light sources in terms of width and downwardly.

The five light modules 10, 11 form a characteristic arrangement, which generates the characteristic appearance of the headlight. Each of these individual light modules 10, 11 generates part of the main light distribution (dipped headlight beam distribution).

To generate the asymmetry component and the maximum in the dipped headlight beam distribution, a further light module 20 is also provided. The light module 20 comprises one or more LED light sources (not illustrated) and at least one lens 21, wherein the lens 21 is a converging lens, by means of which the light of the light sources is projected into the outside space. By contrast with the lenses 13, 14 of the light modules 10, 11, the light in the case of this light module must not be distributed in width and preferably also not in height, since this would destroy the asymmetry (at the LD line).

Figure 3:
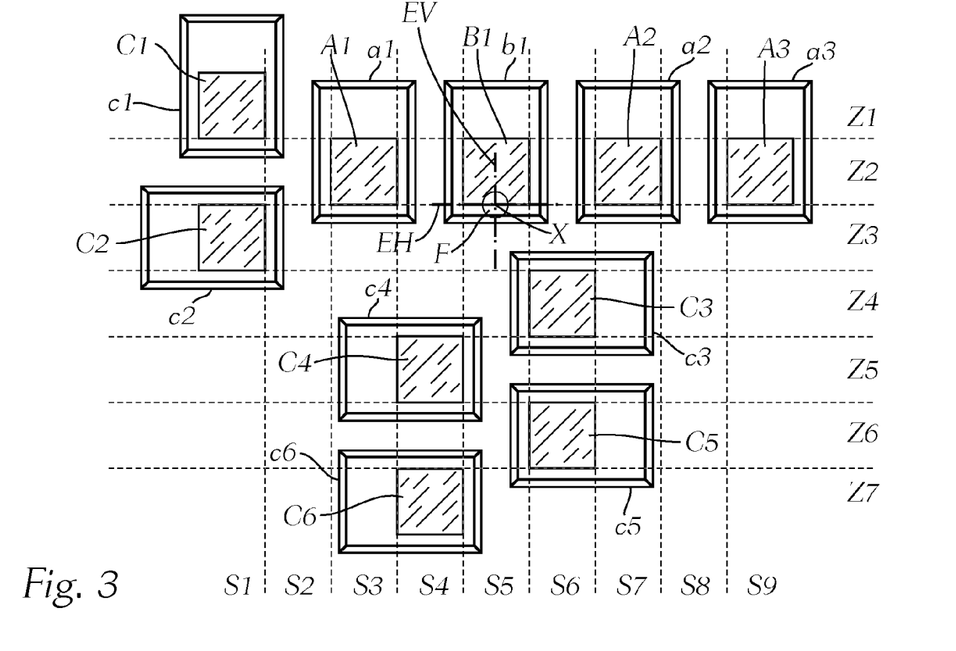
FIG. 3 shows an exemplary arrangement of LED light sources for an LED light module in detail.
Figure 4:
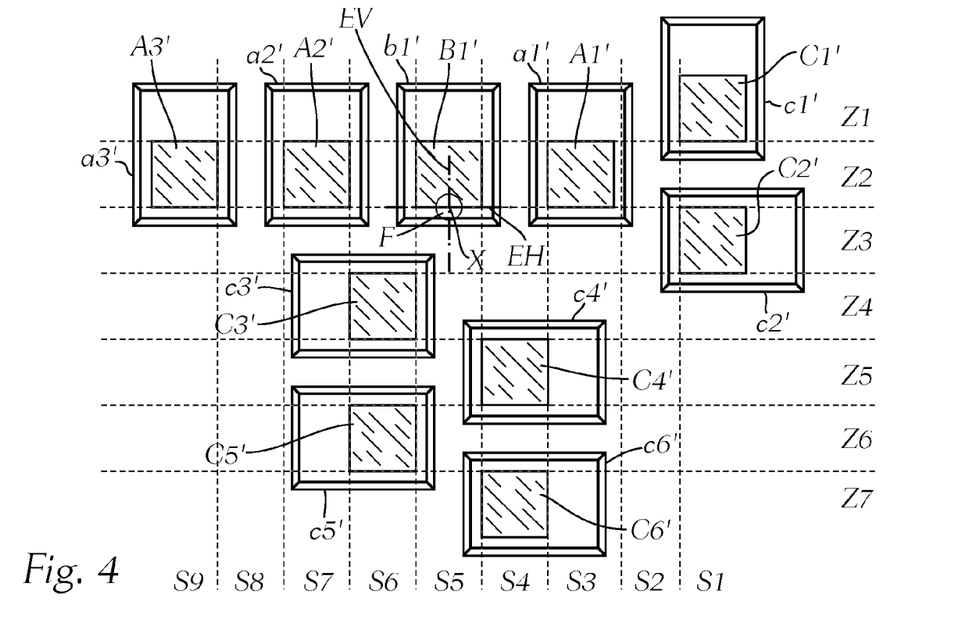
FIG. 4 shows an arrangement, mirroring the arrangement shown in FIG. 3, of LED light sources in an LED light module.

FIG. 3 shows an arrangement of the LED light sources or LED light outlet surfaces thereof of a light module 10, whereas FIG. 4 shows the mirrored arrangement of the LED light sources of a light module 11. FIG. 2 shows the arrangement of the light outlet surfaces from FIG. 3 (to the right) and FIG. 4 (to the left) in planes 10a, 11a (printed circuit boards 10a, 11a).

As can be inferred from FIGS. 3 and 4, a number of LED light sources a1, a2, a3, b1, c1-c6; a1', a2', a3', b1', c1'-c6' in each light module 10, 11 are arranged in a plane 10a, 11a (printed circuit boards 10a, 11a).

Each LED light source a1, a2, a3, b1, c1-c6; a1', a2', a3', b1', c1'-c6' has a rectangular or preferably square light outlet surface A1, A2, A3, B1, C1-C6; A1', A2', A3', B1', C1'-C6'. The side edges of the light outlet surfaces A1, A2, A3, B1, C1-C6; A1', A2', A3', B1', C1'-C6' are oriented parallel to one another, and the LED light sources a1, a2, a3, b1, c1-c6; a1', a2', a3', b1', c1'-c6' in each light module 10, 11 are arranged in horizontal rows Z1-Z7 and vertical columns S1-S9.

The reference signs a1, a2, a3, b1, c1-c6; a1', a2', a3', b1', c1'-c6' denote the housing of the respective LED light source (here, reference is generally made simply to the LED light source), whereas reference signs A1, A2, A3, B1, C1-C6; A1', A2', A3', B1', C1'-C6' denote the actual light-emitting semiconductor chips (LED light outlet surfaces), which are arranged in the housings a1, a2, a3, b1, c1-c6; a1', a2', a3', b1', c1'-c6'.

The LED light sources of a light module are now combined into groups (switching groups), one of these groups being used to generate the main light distribution (dipped headlight beam) and the other group being used to generate the secondary light distribution (daytime running light).

Here, the light outlet surfaces B1, C1-C6; B1', C1'-C6' of the LED light sources b1, c1-c6; b1', c1'-c6' for generating the secondary light distribution are arranged in a plurality of rows Z1-Z7 bordering on one another directly, wherein one or more light outlet surfaces B1, C1-C6; B1', C1'-C6' of a respective LED light source b1, c1-c6; b1', c1'-c6' for generating the secondary light distribution is/are arranged in each row, and wherein the light outlet surfaces B1, C1-C6; B1', C1'-C6' of the LED light sources b1, c1-c6; b1', c1'-c6' for generating the secondary light distribution are distributed between two or more columns S1, S4, S5, S6.

The light outlet surfaces A1, A2, A3, B1; A1', A2', A3', B1' of LED light sources a1, a2, a3, b1; a1', a2', a3', b1' for generating the main light distribution are arranged in at least one row Z2, wherein two or more light outlet surfaces A1, A2, A3, B1; A1', A2', A3', B1' of LED light sources a1, a2, a3, b1; a1', a2', a3', b1' for generating the main light distribution are arranged in at least one of these rows Z2.

The light emitted by the LED light sources of an LED module 10, 11 is irradiated directly onto the lens 13, 14 of the light module and is projected therefrom into the outside space, each light module contributing to the main light distribution or the secondary light distribution depending on the activated group of LED light sources.

If all LEDs of the modules are operated simultaneously at full power, a third function (light distribution) is obtained, specifically a main beam distribution for example. Here, the headlights still look identical from outside.

Due to the specific arrangement of the light outlet surfaces of the LED light sources, a high maximum in the light flux can be achieved on the one hand (by the arrangement of the light outlet surfaces of LED light sources for generating the main light distribution in at least one row) in a specific region of the main light distribution, for example in the case of a dipped headlight beam distribution in the region below the light/dark line, and on the other hand the required expansion over a defined vertical region conventional for such a light distribution, for example in the case of a daytime running light distribution, is provided via the distribution of the light outlet surfaces for the secondary light distribution.

In addition, it is stipulated that the isolux lines in the light exposure have a characteristic predefined course. This is achieved in that the light outlet surfaces in accordance with the invention are arranged in a grid formed of rows and columns.

Due to this specific arrangement, it is possible to dispense with one or more add-on optics, which would be arranged between the light outlet surfaces and the lens.

The LED light sources, that is to say the light outlet surfaces thereof, are arranged for example in a plane surface (plane) as illustrated, however the surface may also be curved, wherein the curvature approximately follows the field curvature of the lens.

A layout of light outlet surfaces shown in FIG. 3 (or FIG. 4) generates an asymmetrical secondary light distribution. For this reason, a headlight has at least one LED light module 10 comprising a first arrangement of light outlet surfaces A1, A2, A3, B1, C1-C6 of its LED light sources a1, a2, a3, b1, c1-c6 as illustrated in FIG. 3, and at least one further LED light module 11 comprising a second arrangement of light outlet surfaces A1', A2', A3', B1', C1'-C6' of its LED light sources a1', a2', a3', b1', c1'-c6' as illustrated in FIG. 4.

The first arrangement (layout according to FIG. 3) of the light outlet surfaces A1, A2, A3, B1, C1-C6 and the second arrangement (layout according to FIG. 4) of the light outlet surfaces A1', A2', A3', B1', C1'-C6' are arranged in a manner mirroring one another with respect to a vertical surface EV, which contains the optical axis X of the LED module 10, 11.

The axis X is normal to the surfaces 10a, 11a and "pierces" the plane 10a, 11a in the focal point F of the lens 13, 14. The plane EV, about which the LED layout is mirrored, and a plane EH, which runs normal to the plane EV and runs through the focal point F of the lens 13, 14, are further indicated in FIGS. 3 and 4.

Modules with a layout and modules with a layout axially symmetrical thereto are used accordingly both in the left and in the right headlight.

Coming back again to the layouts from FIGS. 3 and 4, it can be seen that in the specific advantageous variant, adjacent rows border one another directly; in addition, adjacent columns in the figures likewise border one another directly. The vertical extension ("height") of a light outlet surface of an LED light source corresponds to the height of the row in which it is arranged, and the horizontal extent ("width") of a light outlet surface of an LED light source also corresponds to the width of the column in which it is arranged. It is thus ensured that the rows bordering on one another directly do not form horizontal stripes in the light exposure.

Whilst it is important that the rows border on one another, a bordering of the columns on one another, as is illustrated in the figures, is not necessary. It may indeed be advantageous if the columns border on one another, however vertical stripes, which may be produced as a result of distanced columns, are generally covered by the high width illumination of the lenses of the LED light modules.

The horizontal (or where applicable also the vertical) delimiting sides of the light outlet surfaces in rows (or where applicable columns) bordering on one another are aligned with one another, whereby the formation of stripes in the light exposure is prevented.

It is further advantageous if the height of all rows is the same and the width of all columns is the same. In this case, identical LED light sources can be used.

For example, the height and width of the rows and columns are the same, such that square light outlet surfaces are produced.

In particular, in order to generate a homogeneous light exposure, it is advantageous if precisely one light outlet surface B1, C1-C6; B1', C1'-C6' of a respective LED light source b1, c1-c6; b1', c1'-c6' for generating the secondary light distribution is arranged in each row.

In order to achieve the necessary width of the light distribution and a light exposure that is homogeneous in terms of width, it is additionally advantageous if the light outlet surfaces B1, C1-C6; B1', C1'-C6' of the LED light sources b1, c1-c6; b1', c1'-c6' for generating the secondary light distribution are distributed between two or more columns S1, S4, S5, S6, wherein at least two columns S4, S5, S6 of these columns S1, S4, S5, S6 border on one another directly for example.

Furthermore, the light outlet surfaces A1, A2, A3, B1; A1', A2', A3', B1' of LED light sources a1, a2, a3, b1; a1', a2', a3', b1' for generating the main light distribution are arranged in at least one row Z2, wherein two or more light outlet surfaces A1, A2, A3, B1; A1', A2', A3', B1' of LED light sources a1, a2, a3, b1; a1', a2', a3', b1' for generating the main light distribution are arranged in at least one of these rows Z2, wherein the light outlet surfaces A1, A2, A3, B1; A1', A2', A3', B1' are arranged in different columns S3, S5, S7, S9, wherein, as illustrated, the light outlet surfaces A1, A2, A3, B1; A1', A2', A3', B1' of LED light sources a1, a2, a3, b1; a1', a2', a3', b1' for generating the main light distribution are preferably arranged in precisely one row Z2.

In this way, the conditions placed on a main light distribution (maximum in the light distribution, light/dark border in the case of dipped headlight beam) can be satisfied optimally.

The LED light sources themselves typically consist of a housing, in which the light-emitting chip, that is to say the light outlet surface, is accommodated. The housing of course has a greater extent than this chip, such that it is not generally possible to arrange light outlet surfaces (chips) directly side by side. In addition, it is necessary to lay conductive tracks to the LED light sources for control and power supply purposes, and appropriate cooling of the light sources must also be provided.

All of these considerations are taken into account in principle by the offset arrangement according to the invention of the light outlet surfaces, as a result of which the problems with regard to space are solved. In addition, a simpler thermal management is possible, since the heat produced can be removed more easily due to the fact that the light outlet surfaces do not border on one another. Accordingly, there is no need for complex coolers/fans, and in some circumstances even purely passive cooling is sufficient.

It is in particular advantageous in the above context if at least some of the adjacent columns S3, S5, S7, S9, in which the light outlet surfaces A1, A2, A3, B1; A1', A2', A3', B1' of the LED light sources a1, a2, a3, b1; a1', a2', a3', b1' for generating the main light distribution are arranged, are separated from one another in each case by a column S4, S6, S8.

In particular, it is advantageous if, as in a specific embodiment, the light outlet surfaces A1, A2, A3, B1; A1', A2', A3', B1' of LED light sources a1, a2, a3, b1; a1', a2', a3', b1' for generating the main light distribution are arranged in a plurality of columns S3, S5, S7, S9, said columns S3, S5, S7, S9 being separated in each case by an intermediate column S4, S6, S8.

In order to optimally utilize the installation space in the plane of the light outlet surfaces, an LED light source B1, B1' of an LED light module 10, 11 is further provided in the shown variants according to FIGS. 3 and 4 both to generate the main light distribution and to generate the secondary light distribution.

In the shown specific embodiment, all LED light sources a1, a2, a3, b1, c1-c6; a1', a2', a3', b1', c1'-c6' of an LED light module 10, 11 are further identical, in particular identical in terms of their luminous intensity.

In secondary light operation, the switched-on LED light sources are operated in a dimmed or pulsed manner, that is to say with a luminous intensity lower than the light sources in main light operation.

The LED light sources a1, a2, a3, b1; a1', a2', a3', b1' for generating the main light distribution may also be more intense however than the LED light sources c1-c6; c1'-c6' for generating the secondary light distribution.

In this case, only those LED light sources that contribute to both light distributions are operated in a dimmed manner in secondary light operation.

To summarize, it is thus possible for the "main" LED light sources to be operated at full power and for the "auxiliary" LED light sources to be operated in a pulsed manner or with reduced luminous intensity. It is also conceivable however to use different power classes of the LED light source, accommodated in a favorable standard housing.

The light distributions can be generated optimally if the row Z2 containing the light outlet surfaces A1, A2, A3, B1; A1', A2', A3', B1' of LED light sources a1, a2, a3, b1; a1', a2', a3', b1' for generating the main light distribution is arranged below the uppermost row Z1, which contains a light outlet surface C1, C1' for generating the secondary light distribution, and if, furthermore, the row Z2 containing the light outlet surfaces A1, A2, A3, B1; A1', A2', A3', B1' of LED light sources a1, a2, a3, b1; a1', a2', a3', b1' for generating the main light distribution is arranged above the lowermost row Z7, which contains a light outlet surface C6, C6' for generating the secondary light distribution.

Specifically, the row Z2 is the second row from the top. In total, seven rows and nine columns are provided per light module in the shown advantageous embodiment.

The focal point F of the lens is arranged such that the light-emitting diodes in row Z2 can reproduce the main-lighting function where possible without (great) aberrations in the light exposure. The light-emitting diodes of the secondary lighting function are arranged outside the focal point.

The row Z2 is located directly above the horizontal plane EH through the focal point F of the lens. Due to the lens, the light exposure is mirrored about a horizontal axis and a vertical axis, such that a light distribution is produced beneath a horizontal light/dark border by means of the light-emitting diodes from row Z2.

In addition, an outer column S9 is additionally occupied by at least one, preferably precisely one, light outlet surface A3, A3' of an LED light source a3, a3' for generating the main-lighting function, and the other outer column S1 is occupied by at least one light outlet surface, preferably two, light outlet surfaces C1, C2, C1', C2' of LED light sources c1, c2, c1', c2' for generating the secondary lighting function.

In addition, a plurality of columns S1, S4, S6 comprising light outlet surfaces C1, C2, C4, C6, C3, C5; C1', C2', C4', C6', C3', C5' of LED light sources c1, c2, c4, c6, c3, c5; c1', c2', c4', c6', c3', c5' for generating the secondary light distribution advantageously has at least two such light outlet surfaces, preferably exactly two such light outlet surfaces C1, C2, C4, C6, C3, C5; C1', C2', C4', C6', C3', C5'.

Here, two light outlet light surfaces C1, C2, C4, C6, C3, C5; C1', C2', C4', C6', C3', C5' of LED light sources c1, c2, c4, c6, c3, c5; c1', c2', c4', c6', c3', c5' in the same column S1, S4, S6; S1', S4', S6' for generating the secondary light distribution are in particular separated in each case by at least one row Z2, Z6, Z5; Z2', Z6', Z5'.

It may be favorable if two light outlet surfaces C1, C2, C4, C6, C3, C5; C1', C2', C4', C6', C3', C5' of LED light sources c1, c2, c4, c6, c3, c5; c1', c2', c4', c6', c3', c5' in the same column S1, S4, S6; S1', S4', S6' for generating the secondary light distribution are separated in each case by exactly one row Z2, Z6, Z5; Z2', Z6', Z5'.

For reasons concerning space, the columns S2, S8 are empty, that is to say are not occupied by light outlet surfaces.

Figure 5:
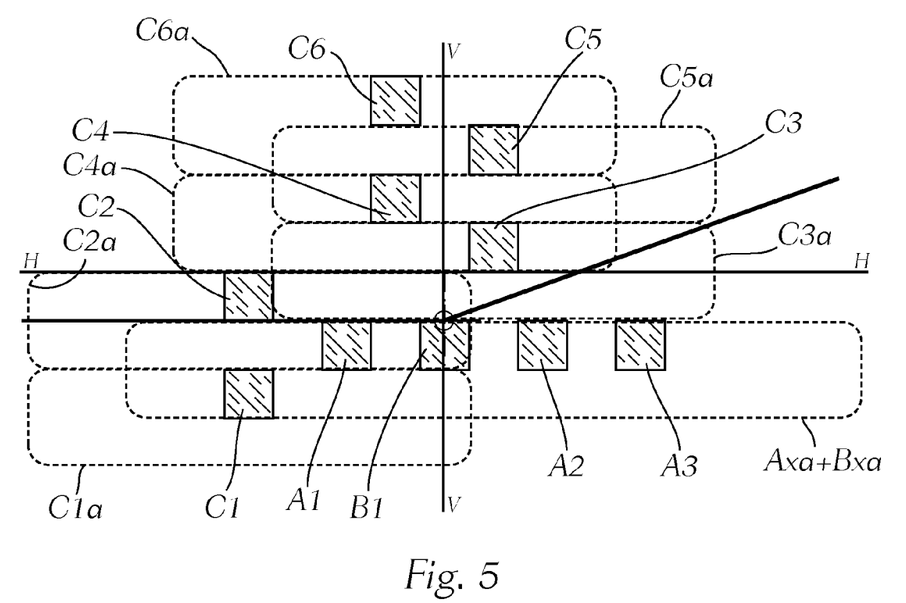
FIG. 5 shows a schematic view of a light exposure projected onto the road by means of an LED light module from FIG. 3.
Figure 6:
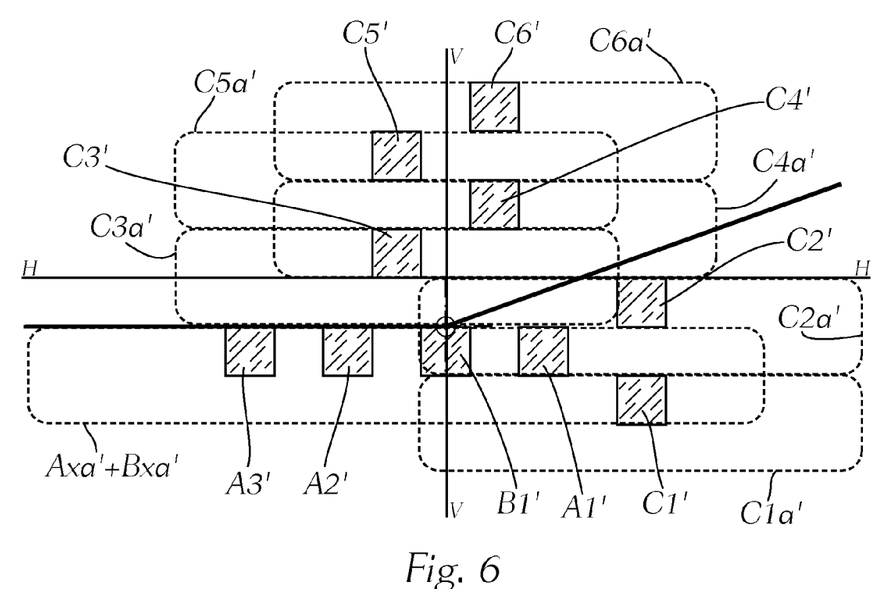
FIG. 6 shows a schematic view of a light exposure projected onto the road by means of an LED light module from FIG. 4.

FIGS. 5 and 6 show the light distribution generated by means of a light module 10 or 11. FIGS. 5 and 6 on the one hand show where the individual light exposures of the light outlet surfaces A1, A2, A3, . . . B1, . . . , C1-C6, . . . would come to lie if the lenses 13 did not exert any horizontally and vertically expanding effect.

Reference signs Axa+Bxa and Axa'+Bxa' represent the light exposure actually generated by the lenses and the light-emitting diodes A1-A3, B1 and A1'-A3', B1' respectively (dipped headlight beam). The asymmetry component in the light/dark border is generated by means of the light module 20.

Reference signs C1a-C6a and C1a'-C6a' lastly represent the light exposures of the individual light-emitting diodes of the secondary light distribution. The light of the individual light-emitting chips is fanned out in width and expanded downwardly.

To this end, the lenses are shaped in such a way that the light beams in the sagittal plane of the lenses is projected straight ahead in the vicinity of the optical axis, whereas the light beams are refracted downwardly to an increasingly greater extent with increasing distance from the upper and lower lens edge.

In the shown example, the two outer lenses 13 in the upper row are mirror-inverted in relation to one another (mirror-inverted about a vertical axis), the lowermost lens 13 being identical to the lens 14 arranged thereabove.

The necessary vertical expansion in the light exposure of the secondary light distribution is obtained due to the extension/division of the light-emitting diodes over a plurality of rows.

Due to the exactly aligned arrangement of the light-emitting diodes of the secondary lighting function, no shadows are produced in the light exposure, wherein shadows would be produced if there were a distance between the light outlet surfaces ("drain grate effect"). An extremely homogeneous secondary light (daytime running light) lights distribution is achieved with the proposed LED arrangement.

LED chips cannot be arranged bordering on one another directly in any number, since they would quickly overheat and would also no longer be able to contact one another. This problem is solved cost-effectively by the present invention without special fabrication of LED chips and/or prints.

The light outlet surfaces are arranged in a grid formed of horizontal rows and vertical columns, the rows and columns each bordering on one another directly, the light outlet surfaces each lying exactly in a sub-box formed by rows and grids, and the light outlet surface corresponding to such a box in terms of shape and size.

Favorable standard LEDs can be used for the invention, and there is no need for special, particularly intense light-emitting diodes.

Figure 7:
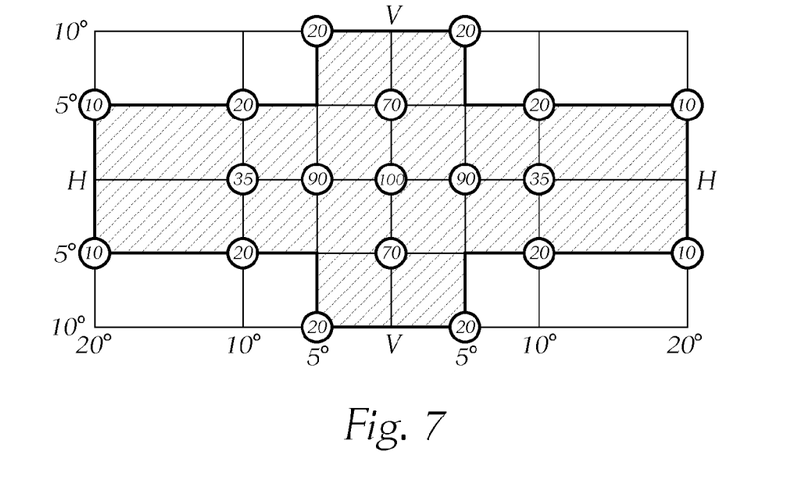
FIG. 7 shows a legally stipulated daytime running light (DRL) light distribution.

FIG. 7 shows a legally stipulated daytime running light (DRL) light distribution, which has a maximum in the center at HV.

This is a light distribution that is not fully homogeneously distributed, rather the light is concentrated in the center, and that extends in the width.

Figure 8A:
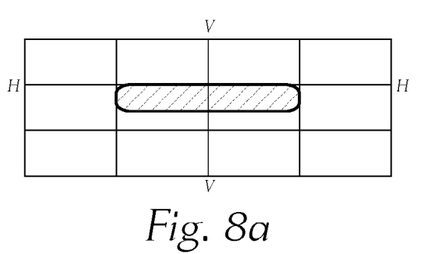
FIGS. 8a-8d show different individual light distributions of an exemplary main-light light distribution, generated by light modules with a free-form lens.
Figure 8B:
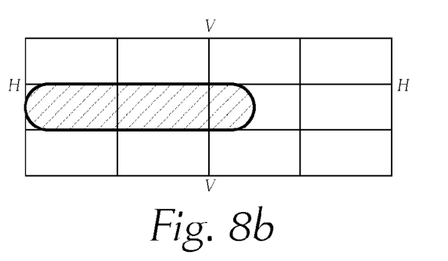
Figure 8C:
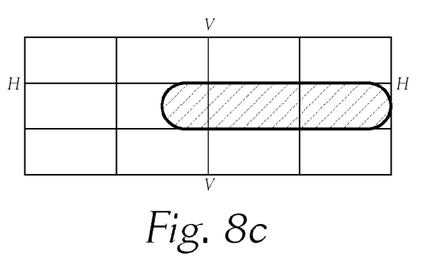
Figure 8D:
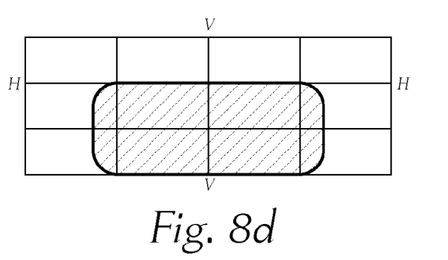
Figure 8E:
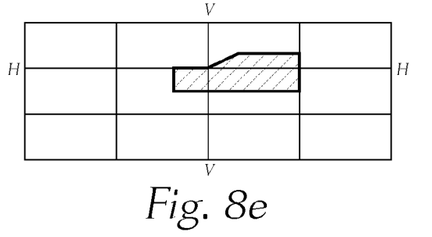
FIG. 8e shows an individual light distribution of an asymmetry light module.
Figure 8F:
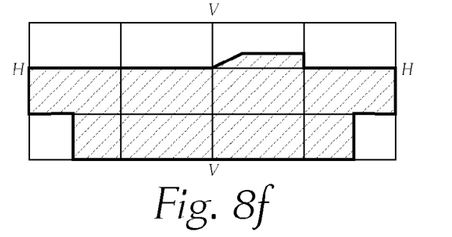
FIG. 8f shows a superimposition of the individual light exposures from FIGS. 8a-8e.

FIG. 8f shows a dipped headlight beam distribution. FIGS. 8a-8d show a set of possible individual light distributions (of the main light distribution) of individual modules 10, 11 with corresponding lenses 13, for example free-form lenses, as a contribution to this main beam/dipped headlight beam distribution. The different light distributions are produced by the different lenses 13.

With the light distribution in FIG. 8a, a high maximum of the light flux is achieved at the light/dark line, the light distributions in FIG. 8b and FIG. 8c producing the necessary width, and the light distribution in FIG. 8d providing a contribution for the front of the dipped headlight beam distribution. With an additional lens module 20 (converging lens 21), the asymmetry light distribution in FIG. 8e is obtained. In the exemplary asymmetry module 20, the typical rise in the light exposure of the dipped headlight beam distribution is generated by means of a primary LED light source in cooperation with a light tunnel as part of an optical element 23.

By superimposing the light distributions, the dipped headlight beam distribution in FIG. 8f is ultimately obtained.

The invention claimed is:

1. A vehicle headlight (1) for generating a main light distribution and a secondary light distribution, wherein the vehicle headlight (1) comprises two or more LED light modules (10, 11), wherein each LED light module (10, 11) comprises a number of LED light sources (a1, a2, a3, b1, c1-c6; a1', a2', a3', b1', c1'-c6'), wherein each LED light source (a1, a2, a3, b1, c1-c6; a1', a2', a3', b1', c1'-c6') consists of a housing (a1, a2, a3, b1, c1-c6; a1', a2', a3', b1', c1'-c6') and a light-emitting semiconductor chip which is arranged in the housing and has a rectangular or square light outlet surface (A1, A2, A3, B1, C1-C6; A1', A2', A3', B1', C1'-C6'),
wherein the housing of the LED light sources (a1, a2, a3, b1, c1-c6; a1', a2', a3', b1', c1'c6') in each case has a greater extent than its light-emitting chip,
and wherein the light outlet surfaces (A1, A2, A3, B1, C1-C6; A1', A2', A3', B1'-C1'-C6') lie in a common surface, and wherein the side edges of the light outlet surfaces (A1, A2, A3, B1, C1-C6; A1', A2', A3', B1', C1'-C6') are oriented parallel to one another, and wherein the LED light sources (a1, a2, a3, b1, c1-c6; a1', a2', a3', b1', c1'-c6') are arranged in horizontal rows (Z1-Z7) and vertical columns (S1-S9),
and wherein each LED light module (10, 11) comprises a lens (13, 14), and wherein the light emitted by the LED light sources of an LED module (10, 11) is irradiated directly onto the lens (13, 14) and is projected therefrom into the outside space, wherein the light emitted by the LED light sources of the LED modules (10, 11) forms the main light distribution or the secondary light distribution,
wherein one or more light outlet surfaces (B1, C1-C6; B1', C1'-C6') of a respective LED light source (b1, c1-c6; b1', c1'-c6') for generating the secondary light distribution is/are arranged in each row,
and wherein the light outlet surfaces (B1, C1-C6; B1', C1'-C6') of the LED light sources (b1, c1-c6; b1', c1'-c6') for generating the secondary light distribution are distributed between at least one column, preferably between two or more columns (S1, S4, S5, S6),
and wherein the light outlet surfaces (A1, A2, A3, B1; A1', A2', A3', B1') of LED light sources (a1, a2, a3, b1; a1', a2', a3', b1') for generating the main light distribution are arranged in at least one row (Z2),
wherein at least one light outlet surface (A1, A2, A3, B1; A1', A2', A3', B1') of LED light sources (a1, a2, a3, b1; a1', a2', a3', b1') for generating the main light distribution is arranged in the at least one row (Z2),
characterized in that
the light outlet surfaces (B1, C1-C6; B1', C1'-C6') of the LED light sources (b1, c1-c6; b1', c1'-c6') for generating the secondary light distribution are arranged in a plurality of rows (Z1-Z7) bordering on one another directly, and wherein
the vertical extension ("height") of the light outlet surfaces of the LED light sources corresponds to the height of the row in which the light outlet surface is arranged.

2. The headlight as claimed in claim 1, characterized in that exactly one light outlet surface (B1, C1-C6; B1', C1'-C6') of a respective LED light source (b1, c1-c6; b1', c1'-c6') for generating the secondary light distribution is arranged in each row.

3. The headlight as claimed in claim 1, characterized in that the light outlet surfaces (B1, C1-C6; B1', C1'-C6') of the LED light sources (b1, c1-c6; b1', c1'-c6') for generating the secondary light distribution are distributed between two or more columns (S1, S4, S5, S6),
wherein at least two columns (S4, S5, S6) of these columns (S1, S4, S5, S6) border on one another directly.

4. The headlight as claimed in claim 1, characterized in that the light outlet surfaces (A1, A2, A3, B1; A1', A2', A3', B1') of LED light sources (a1, a2, a3, b1; a1', a2', a3', b1') for generating the main light distribution are arranged in at least one row (Z2), wherein two or more light outlet surfaces (A1, A2, A3, B1; A1', A2', A3', B1') of LED light sources (a1, a2, a3, b1; a1', a2', a3', b1') for generating the main light distribution are arranged in the at least one row (Z2), wherein the light outlet surfaces (A1, A2, A3, B1; A1', A2', A3', B1') are arranged in different columns (S3, S5, S7, S9).

5. The headlight as claimed in claim 1, characterized in that the light outlet surfaces (A1, A2, A3, B1; A1', A2', A3', B1') of LED light sources (a1, a2, a3, b1; a1', a2', a3', b1') for generating the main light distribution are arranged in precisely one row (Z2).

6. The headlight as claimed in claim 1, characterized in that at least some of the adjacent columns (S3, S5, S7, S9), in which the light outlet surfaces (A1, A2, A3, B1; A1', A2', A3', B1') of the LED light sources (a1, a2, a3, b1; a1', a2', a3', b1') for generating the main light distribution are arranged, are in each case separated from one another by a column (S4, S6, S8).

7. The headlight as claimed in claim 1, characterized in that the light outlet surfaces (A1, A2, A3, B1; A1', A2', A3', B1') of LED light sources (a1, a2, a3, b1; a1', a2', a3', b1') for generating the main light distribution are arranged in a plurality of columns (S3, S5, S7, S9), said columns (S3, S5, S7, S9) being separated in each case by an intermediate column (S4, S6, S8).

8. The headlight as claimed in claim 1, characterized in that at least one LED light source (B1, B1') of an LED light module (10, 11) is provided both to generate the main light distribution and to generate the secondary light distribution.

9. The headlight as claimed in claim 8, characterized in that precisely one LED light source (B1, B1') of an LED light module (10, 11) is provided to generate the main light distribution and to generate the secondary light distribution.

10. The headlight as claimed in claim 1, characterized in that all LED light sources (a1, a2, a3, b1, c1-c6; a1', a2', a3', b1', c1'-c6') of an LED light module (10, 11) are identical in terms of their luminous intensity.

11. The headlight as claimed claim 1, characterized in that the LED light sources (a1, a2, a3, b1; a1', a2', a3', b1') for generating the main light distribution are more intense than the LED light sources (c1-c6; c1'-c6') for producing the secondary light distribution.

12. The headlight as claimed in claim 1, wherein:
one of the at least one LED light modules (10) comprises a first arrangement of light outlet surfaces (A1, A2, A3, B1, C1-C6) of its LED light sources (a1, a2, a3, b1, c1-c6), and
another of the at least one LED light modules (11) comprises a second arrangement of light outlet surfaces (A1', A2', A3', B1', C1'-C6') of its LED light sources (a1', a2', a3', b1', c1'-c6').

13. The headlight as claimed in claim 1, characterized in that the at least one row (Z2) containing the light outlet surfaces (A1, A2, A3, B1; A1', A2', A3', B1') of LED light sources (a1, a2, a3, b1; a1', a2', a3', b1') for generating the main light distribution is arranged below the uppermost row (Z1), which contains at least one light outlet surface (C1, C1') for generating the secondary light distribution.

14. The headlight as claimed in claim 1, characterized in that the at least one row (Z2) containing the light outlet surfaces (A1, A2, A3, B1; A1', A2', A3', B1') of LED light sources (a1, a2, a3, b1; a1', a2', a3', b1') for generating the main light distribution is arranged above the lowermost row (Z7), which contains at least one light outlet surface (C6, C6') for generating the secondary light distribution.

15. The headlight as claimed in claim 1, characterized in that an outer column (S9) is occupied by at least one light outlet surface (A3, A3') of an LED light source (a3, a3') for generating the main-lighting function, and the other outer column (S1) is occupied by at least one light outlet surface (C1, C2, C1', C2') of an LED light source (c1, c2, c1', c2') for generating a secondary lighting function.

16. The headlight as claimed in claim 1, characterized in that a plurality of columns (S1, S4, S6) comprising light outlet surfaces (C1, C2, C4, C6, C3, C5; C1', C2', C4', C6', C3', C5') of LED light sources (c1, c2, c4, c6, c3, c5; c1', c2', c4', c6', c3', c5') for generating the secondary light distribution have at least two such light outlet surfaces (C1, C2, C4, C6, C3, C5; C1', C2', C4', C6', C3', C5').

17. The headlight as claimed in claim 16, characterized in that two light outlet surfaces (C1, C2, C4, C6, C3, C5; C1', C2', C4', C6', C3', C5') of LED light sources (c1, c2, c4, c6, c3, c5; c1', c2', c4', c6', c3', c5') in the same column (S1, S4, S6; S1', S4', S6') for generating the secondary light distribution are separated in each case by at least one row (Z2, Z6, Z5; Z2', Z6', Z5').

18. The headlight as claimed in claim 17, characterized in that two light outlet surfaces (C1, C2, C4, C6, C3, C5; C1', C2', C4', C6', C3', C5') of LED light sources (c1, c2, c4, c6, c3, c5; c1', c2', c4', c6', c3', c5') in the same column (S1, S4, S6; S1', S4', S6') for generating the secondary light distribution are in each case separated by precisely one row (Z2, Z6, Z5; Z2', Z6', Z5').

19. The vehicle headlight as claimed in claim 1, characterized in that the lenses (13) of the individual light modules (10) are formed in such a way that superimposed light exposures of the individual light modules (10) produce a main-lighting function and/or a secondary lighting function.

20. The vehicle headlight as claimed in claim 19, characterized in that the lenses (13) are free-form lenses.

21. The vehicle headlight as claimed in claim 1, further comprising at least one further light module (20) for generating an asymmetry component in the main light distribution.

22. The vehicle headlight as claimed in claim 21, characterized in that the at least one further light module (20) has at least one LED light source and at least one lens (21).

23. The vehicle headlight as claimed in claim 22, characterized in that the lens (21) is a converging lens.

24. The vehicle headlight as claimed in claim 1, characterized in that the main light distribution is a dipped light distribution, for example a dipped headlight beam distribution, fog light or motorway light.

25. The vehicle headlight as claimed in claim 1, characterized in that the secondary light distribution is a daytime running light distribution.

26. The vehicle headlight as claimed in claim 1, characterized in that adjacent rows border on one another directly.

27. The vehicle headlight as claimed in claim 1, characterized in that adjacent columns border on one another directly.

28. The vehicle headlight as claimed in claim 1, characterized in that the horizontal extension ("width") of a light outlet surface of an LED light source corresponds to the width of the column in which it is arranged.

29. The vehicle headlight as claimed claim 1, characterized in that the height of all rows is the same.

30. The vehicle headlight as claimed claim 1, characterized in that the width of all columns is the same.

31. The vehicle headlight as claimed claim 1, characterized in that the height and width of the rows and columns are the same.

32. The vehicle headlight of claim 1, wherein two or more of the light outlet surfaces (A1, A2, A3, B1; A1', A2', A3', B1') of LED light sources (a1, a2, a3, b1; a1', a2', a3', b1') for generating the main light distribution are arranged in the at least one row (Z2).

33. The vehicle headlight of claim 12, wherein the first arrangement of the light outlet surfaces (A1, A2, A3, B1, C1-C6) and the second arrangement of the light outlet surfaces (A1', A2', A3', B1', C1'-C6') are arranged in a manner mirroring one another with respect to a vertical surface containing the optical axis (X) of the LED module (10, 11).

34. The vehicle headlight of claim 16, wherein the plurality of columns (S1, S4, S6) comprising light outlet surfaces (C1, C2, C4, C6, C3, C5; C1', C2', C4', C6', C3', C5') of LED light sources ($c1, c2, c4, c6, c3, c5; c1', c2', c4', c6', c3', c5'$) for generating the secondary light distribution have precisely two of the light outlet surfaces (C1, C2, C4, C6, C3, C5; C1', C2', C4', C6', C3', C5').

35. The vehicle headlight of claim 20, wherein the free-form lenses expand the light exposure of the individual LED light sources downwardly and/or in terms of width.

\* \* \* \* \*